US012386043B2

United States Patent
Yun et al.

(10) Patent No.: US 12,386,043 B2
(45) Date of Patent: Aug. 12, 2025

(54) ROTARY TYPE LIDAR SENSOR USING INDUCTIVE POWER AND WIRELESS DATA TRANSMISSION

(71) Applicant: CARNAVICOM CO., LTD., Incheon (KR)

(72) Inventors: Jae Jun Yun, Incheon (KR); Tae Won Chong, Incheon (KR)

(73) Assignee: CARNAVICOM CO., LTD., Incheon (KR)

( * ) Notice: Subject to any disclaimer, the term of this patent is extended or adjusted under 35 U.S.C. 154(b) by 879 days.

(21) Appl. No.: 17/627,949

(22) PCT Filed: Aug. 12, 2019

(86) PCT No.: PCT/KR2019/010190
§ 371 (c)(1),
(2) Date: Jan. 18, 2022

(87) PCT Pub. No.: WO2021/015351
PCT Pub. Date: Jan. 28, 2021

(65) Prior Publication Data
US 2022/0291351 A1   Sep. 15, 2022

(30) Foreign Application Priority Data
Jul. 22, 2019   (KR) .................. 10-2019-0088047

(51) Int. Cl.
G06K 9/00 (2022.01)
G01S 7/481 (2006.01)
G01S 17/931 (2020.01)
H01F 38/14 (2006.01)

(52) U.S. Cl.
CPC .......... *G01S 7/4817* (2013.01); *G01S 7/4813* (2013.01); *G01S 17/931* (2020.01); *H01F 38/14* (2013.01)

(58) Field of Classification Search
CPC ........ G01S 7/4817; H01F 38/14; H02J 50/10; H02K 7/00; H02K 7/003
See application file for complete search history.

(56) References Cited

U.S. PATENT DOCUMENTS

2018/0267170 A1* 9/2018 Kuroda ................. G01S 15/931

FOREIGN PATENT DOCUMENTS

| JP | 2013-061030 A | 4/2013 |
|---|---|---|
| KR | 10-2014-0025041 A | 3/2014 |
| KR | 10-2015-0039483 A | 4/2015 |
| KR | 10-2018-0080014 A | 7/2018 |
| KR | 10-2018-0107522 A | 10/2018 |

OTHER PUBLICATIONS

International Search Report of PCT/KR2019/010190, dated Apr. 21, 2020.
Written Opinion of the International Searching Authoriity of PCT/KR2019/010190, dated Apr. 21, 2020.

* cited by examiner

*Primary Examiner* — Muhammad S Islam (57) ABSTRACT

A rotary type lidar sensor using inductive power and wireless data transmission is disclosed. The lidar sensor includes a second board, a lidar module disposed on one surface of the second board and configured to scan a specific range and a power generation unit configured to generate a power. The power generated by the power generation unit is supplied to the lidar module through the second board without using a cable, and the lidar module does not rotate itself but rotates in response to rotation of the second board.

15 Claims, 5 Drawing Sheets

ROTARY TYPE LIDAR SENSOR USING INDUCTIVE POWER AND WIRELESS DATA TRANSMISSION

CROSS-REFERENCE TO RELATED APPLICATIONS

This application is a National Stage Entry of PCT International Application No. PCT/KR2019/010190, which was filed on Aug. 12, 2019, and which claims priority from and the benefit of Korean Patent Application 10-2019-0088047, filed with the Korean Intellectual Property Office on Jul. 22, 2019, the disclosure of which are hereby incorporated by reference in its entirety.

TECHNICAL FIELD

The present disclosure relates to a rotary type lidar sensor using inductive power and wireless data transmission.

BACKGROUND ART

Generally, a lidar sensor rotates an internal mirror by 360° so as to scan wide range. To realize this rotation by 360°, the lidar sensor uses mechanical structure such as a slip ring and so on. As a result, lifetime of the lidar sensor depends on abrasion degree of the slip ring, manufacturing cost of the lidar sensor increases because the slip ring is expensive, and noise may occur due to the slip ring.

Internal cable is used for transmitting lidar information obtained by the lidar sensor to an external device. However, the usage of the cable affects to data transmission with damage of the slip ring.

SUMMARY

The present disclosure is to provide a rotary type lidar sensor using inductive power and wireless data transmission.

A lidar sensor according to one embodiment of the present disclosure includes a second board; a lidar module disposed on one surface of the second board and configured to scan a specific range; and a power generation unit configured to generate a power. Here, the power generated by the power generation unit is supplied to the lidar module through the second board without using a cable, and the lidar module does not rotate itself but rotates in response to rotation of the second board.

A lidar sensor according to another embodiment of the present disclosure includes a first board; a second board; a lidar module disposed on one surface of the second board and configured to scan a specific range; a transmission unit disposed on other surface of the second board; and a reception unit disposed on the first board. Here, the lidar module does not rotate itself but rotate in response to rotation of the second board, lidar information outputted from the lidar module is transmitted from the transmission unit to the reception unit through wireless communication, and the reception unit provides the transmitted lidar information to an external computing device.

A lidar sensor according to still another embodiment of the present disclosure includes a first board; a second board; a lidar module disposed on one surface of the second board and configured to scan a certain range; and a motor. Here, an axis of the motor or a shaft connected to the axis is connected to the second board, information outputted from the lidar module is transmitted to the first board through the second board, the second board and the lidar module rotate in response to rotation of the axis of the motor, and the lidar module does not rotate itself.

A lidar sensor of the present disclosure rotates internal lidar module by 360° and supplies a power to the lidar module by using inductive power, without using a cable. Accordingly, breakdown of the lidar sensor due to abrasion of mechanical structure may not occur, and manufacturing cost of the lidar sensor may be downed.

Additionally, the lidar sensor rotates the lidar module by 360° and transmits lidar information obtained by the lidar module through optical communication, without using a cable. Accordingly, cable kink does not occur, and thus breakdown of the lidar module or data loss may not be generated.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to a lidar sensor using inductive power and wireless data transmission. A lidar module in the lidar sensor may rotate by 360° so as to realize omnidirectional scanning.

Specially, the lidar sensor rotates the lidar module using a motor without usage of a slip ring and supplies a power to the lidar module by using an inductive coil. Hence, breakdown of the lidar sensor due to mechanical abrasion (component abrasion) may not occur, manufacturing cost of the lidar sensor may be downed, and flexible supplement of a power may be provided to the lidar module.

Additionally, since the lidar sensor transmits data through optical communication, noise inflow when the data is transmitted, cable kink and data loss due to mechanical abrasion may not occur.

Hereinafter, various embodiments of the invention may be described in detail with reference to accompanying drawings.

Figure 1:
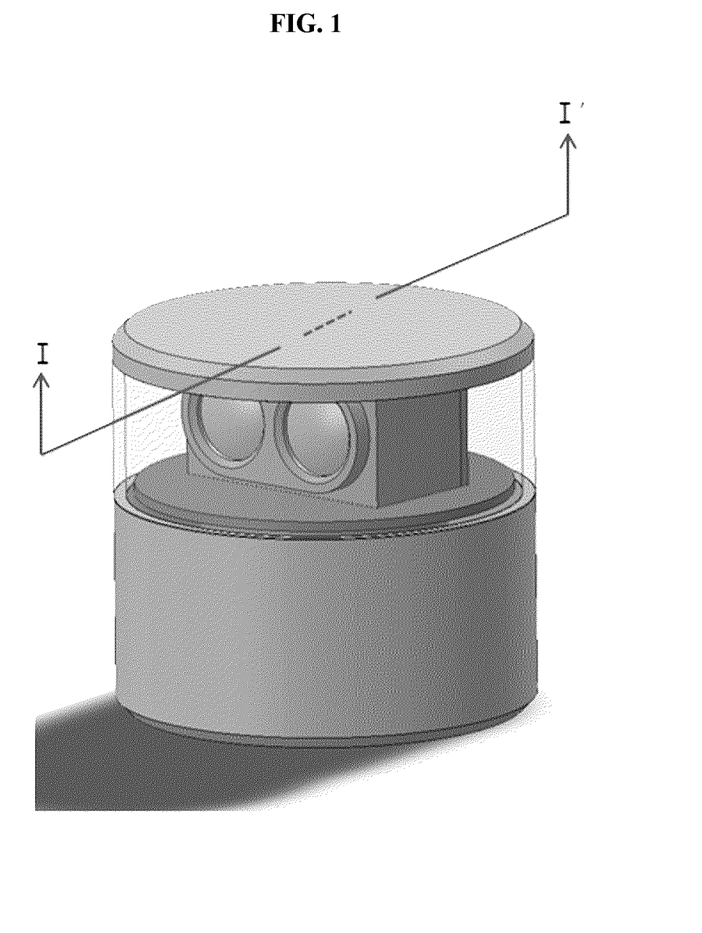
FIG. 1 is a perspective view illustrating a lidar sensor according to one embodiment of the present disclosure.
Figure 2:
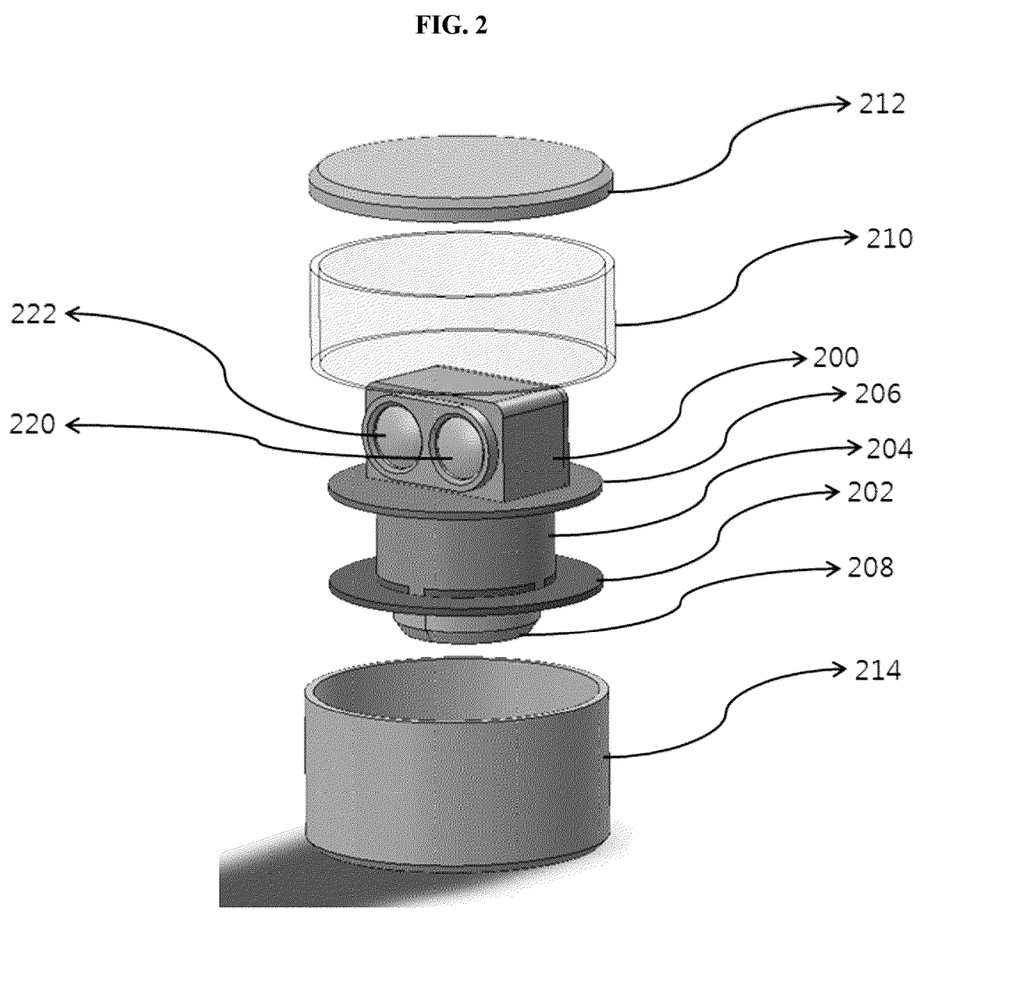
FIG. 2 is a view illustrating decomposition structure of the lidar sensor according to one embodiment of the disclosure.
Figure 3:
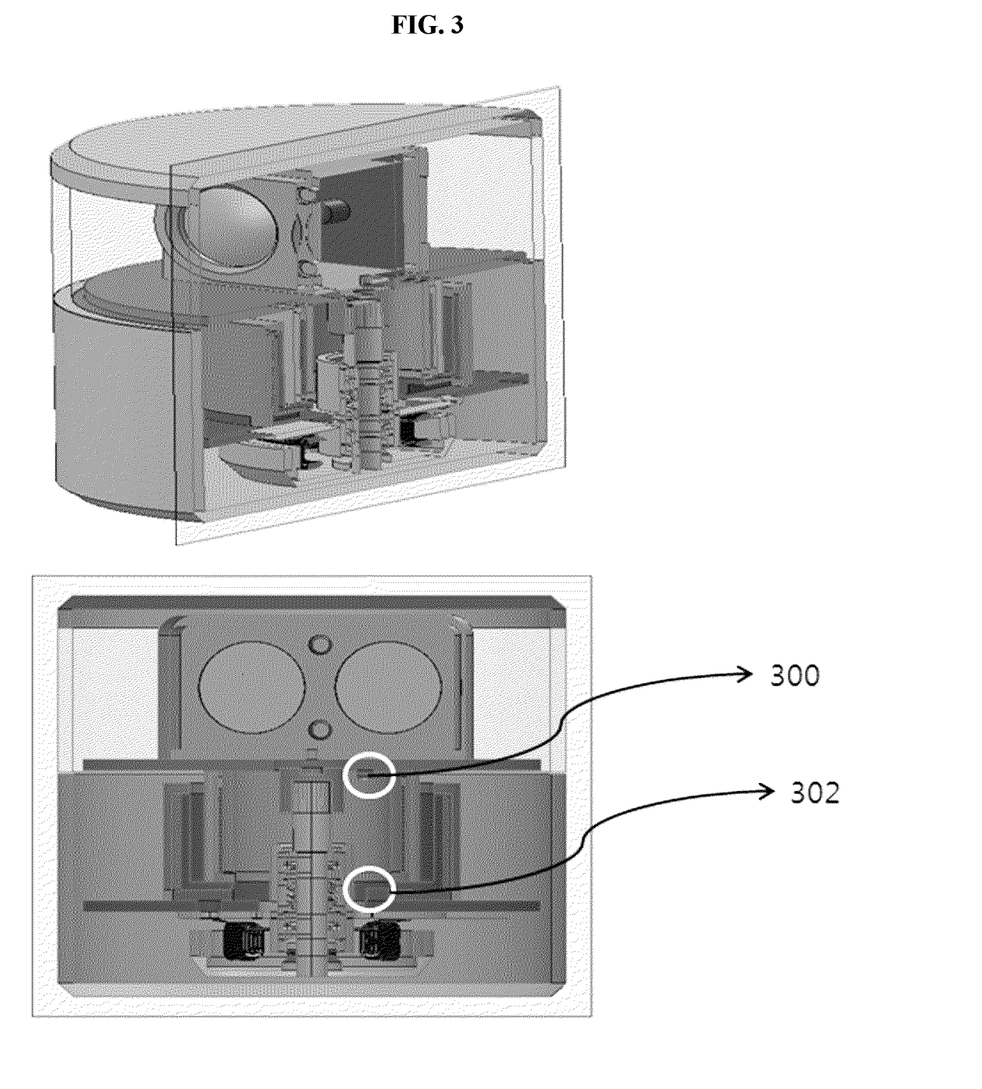
FIG. 3 is a cross-sectional view illustrating a lidar sensor taken along a line I-I' of the lidar sensor of FIG. 1.
Figure 4:
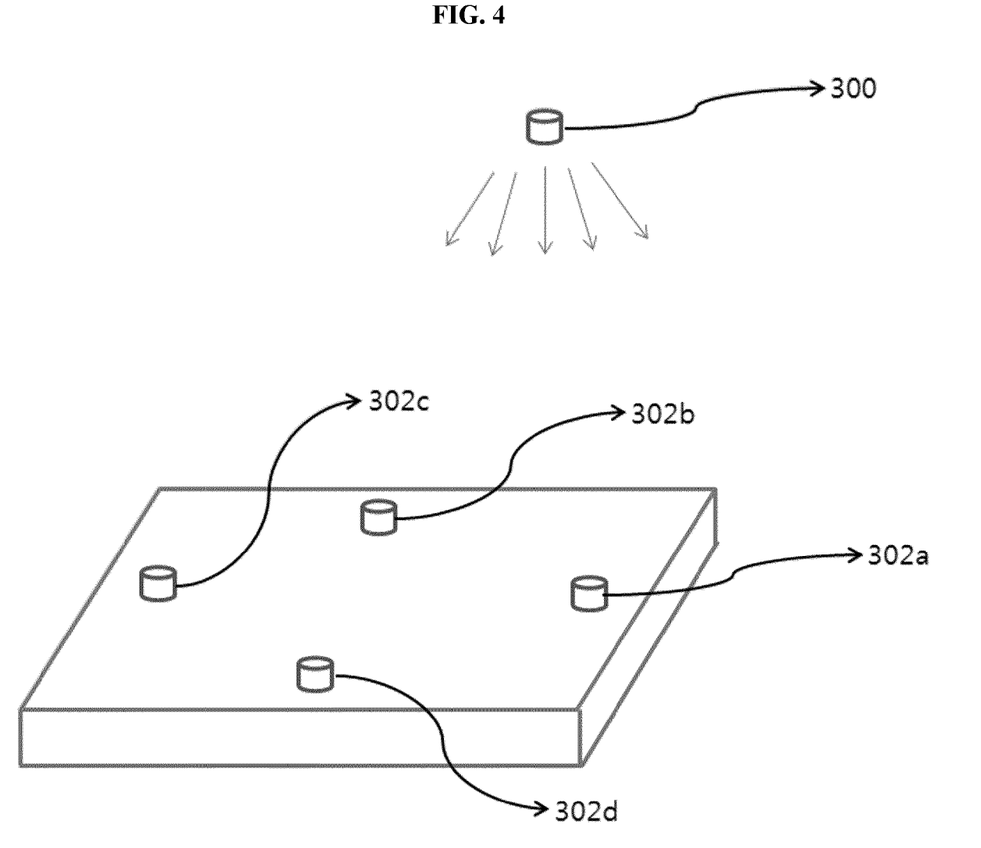
FIG. 4 is a view illustrating wireless data communication of the lidar sensor according to one embodiment of the disclosure.
Figure 5:
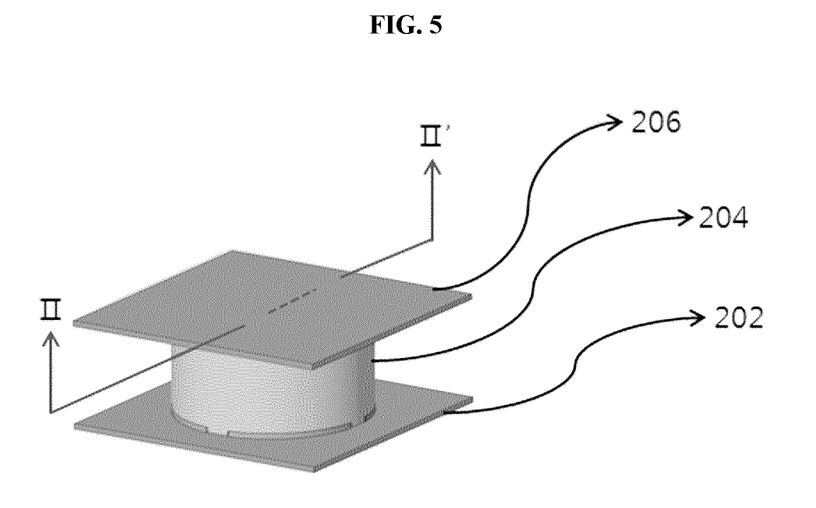
FIG. 5 is a view illustrating inductive coils and circuit boards according to one embodiment of the disclosure.
Figure 6:
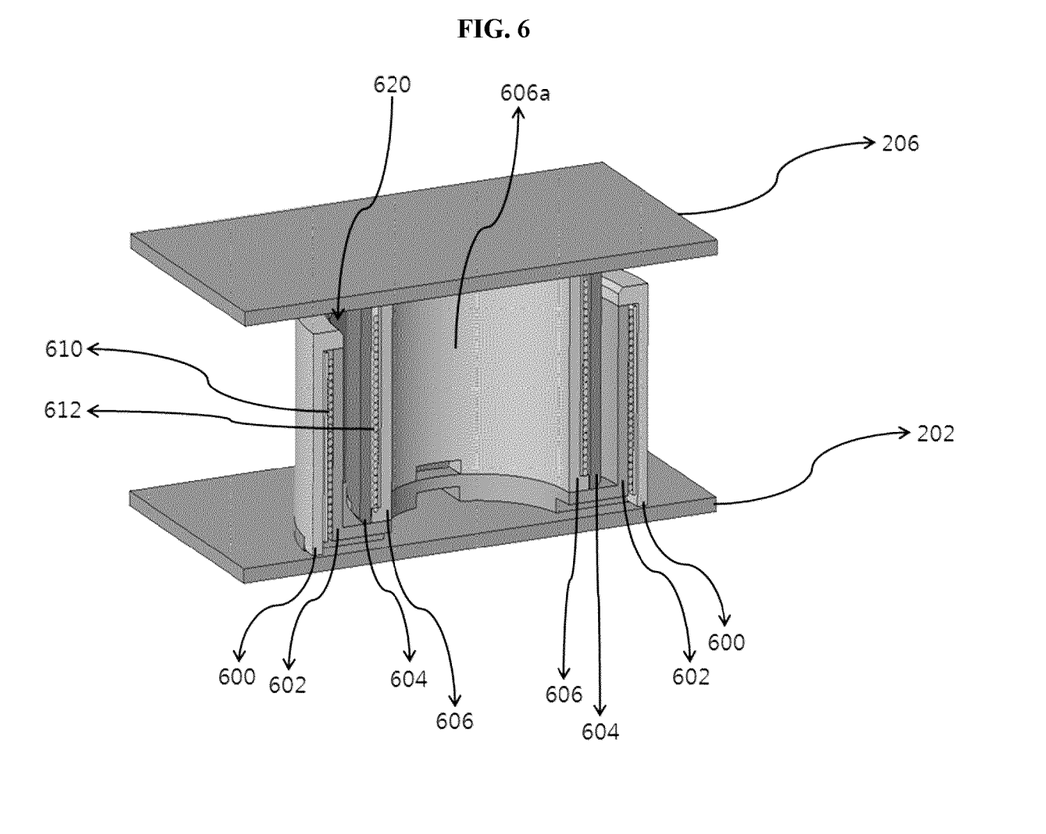
FIG. 6 is a cross-sectional view illustrating structure of the inductive coil and the circuit board taken along a line II-II' of the embodiment of FIG. 5.

FIG. 1 is a perspective view illustrating a lidar sensor according to one embodiment of the invention, FIG. 2 is a view illustrating decomposition structure of the lidar sensor according to one embodiment of the disclosure, and FIG. 3 is a sectional view illustrating a lidar sensor taken along a line of I-I' according to one embodiment of the disclosure. FIG. 4 is a view illustrating wireless data communication of the lidar sensor according to one embodiment of the disclosure, FIG. 5 is a view illustrating inductive coils and circuit boards according to one embodiment of the disclosure, and FIG. 6 is a sectional view illustrating structure of the inductive coil and the circuit board taken along a line of II-II' according to one embodiment of the disclosure.

In FIG. 1 and FIG. 2, a lidar sensor of the present embodiment may include a lidar module 200, a first circuit board 202, a power generation unit 204, a second circuit board 206, a motor 208, a window 210, an upper cover 212 and a lower cover 214.

The lidar module 200 may output a light, e.g. laser using internal light emitting element (not shown) and detect a distance to an object, etc. through analysis of a laser reflected by the object received by internal light reception unit (not shown). That is, the lidar module 200 may scan desired area.

In one embodiment, the lidar module 200 does not rotate itself and does not include an element rotating by 360°, and so it may scan only fixed range. However, since the lidar module 200 can be rotated by 360° by using the motor 208, the lidar module 200 may achieve omnidirectional scanning. Of course, rotation range of the lidar module 200 is not limited to 360° as long as the lidar module 200 can san wide range through the rotation, and for example the lidar module 200 may scan only a specific range.

Specially, different resolution may be realized for each of scan range when an operation frequency of a light emitting unit in the lidar module 200 is adjusted while the lidar module 200 rotates. For example, further more laser is outputted in a range of 0° to 90° if an operation frequency of the laser in the range of 0° to 90° is higher than that of the laser in the range of 90° to 360°, while the lidar module 200 rotates by 360° by using the motor 208. As a result, the lidar module 200 may scan an area corresponding to the range of 0° to 90° with higher resolution than the other area. That is, the lidar module 200 may adjust horizontal resolution for each of the range.

In another example, the lidar module 200 may include plural light emitting units and the light emitting units may output the laser in different angle. The lidar module 200 may adjust vertical resolution and increase a scan range when an operation frequency of at least one of the light emitting units is differently set. That is, the lidar module 200 may scan a specific range in high resolution, in view of the vertical resolution.

In still another example, the horizontal resolution and the vertical resolution of the lidar module 200 may be adjusted at a time, when the light emitting units output the lasers in different angle and the operation frequencies of the light emitting units are differently set for each of rotation angles.

In one embodiment, the lidar module 200 may include a light emitting window 220 through which a light outputted from the light emitting unit is outputted and a reception window 222 through which a reflected light is passed, wherein the reflected light is delivered to the reception unit through the reception window 222.

In one embodiment, the lidar module 200 is disposed on the second circuit board 206, and an axis of the motor 208 or a shaft connected to the axis may be combined with a lower surface of the second circuit board 206. As a result, the second circuit board 206 rotates when the axis of the motor 208 rotates, thereby rotating the lidar module 200.

In another embodiment, the lidar module 200 may be removable from the second circuit board 206. In this case, the lidar module 200 may scan wide range by rotated by the motor 208 or scan only a fixed range while it is separated from the second circuit board 206. That is, the lidar module 200 may be variously utilized because the lidar module 200 is removable from the second circuit board 206.

In the event that the lidar module 200 is separated from the second circuit board 206, a power may be applied to the lidar module 200 from a battery (not shown) of a vehicle via a cable, i.e. the power may be supplied from extra power supplying means. To realize the supplying of the power, the lidar module 200 may further include a power supplying terminal.

The first circuit board 202 is for example a PCB and may control the power generation unit 204 to generate a power by using a power supplied from an external source, e.g. the battery of the vehicle.

Moreover, the first circuit board 202 may deliver lidar information provided from the lidar module 200 to a computing device, e.g. PC through wireless communication as described below. The computing device may control operation of the lidar sensor or the vehicle based on the delivered lidar information.

For example, the computing device may come to sudden stop the vehicle by controlling automatically a brake of the vehicle when it is determined through analyzing of the lidar information that a person makes an abrupt appearance in front of the vehicle.

For another example, the computing device may control the lidar module 200 or the motor 208 so that the lidar module 200 scans an area where the accident took place in high resolution, when it is determined through the analyzing of the lidar information that vehicle accident occurs in front.

The power generation unit 204 may generate a power (energy) according to a power provided from the first circuit board 202. The generated power may be used for operating the lidar module 200.

In one embodiment, the power generation unit 204 may generate the power by using inductive coils 610 and 612 as shown in FIG. 6. Particularly, electromotive force is generated to the second inductive coil 612 when a power supplied from the first circuit board 202 to the first inductive coil 610 is changed. To realize this operation, one terminal of the first inductive coil 610 may be electrically connected to the first circuit board 202 so that a power is supplied from e.g. the battery of the vehicle, and one terminal of the second inductive coil 612 may be electrically connected to the second circuit board 206 so that the power generated by the second inductive coil 612 is supplied to the lidar module 200 through the second circuit board 206.

Of course, electromotive force may be generated to the second inductive coil 612 by changing the power supplied to the first inductive coil 610, while the first inductive coil 610 is electrically connected to the first circuit board 202 and the second inductive coil 612 is electrically connected to the second circuit board 206.

That is, the power generation unit 204 of the present embodiment may provide the power to the lidar module 200 without using the cable. If the power provides to the lidar module 200 using the cable, cable kink, etc. occurs because the lidar module 200 rotates. As a result, the lidar sensor may be broken down, and so the power may not be smoothly applied to the lidar module 200. Accordingly, to supply the power to the lidar module 200 without using the cable with rotating the lidar module 200, the lidar sensor generates the power through an inductive coil technique and supplies the generated power to the lidar module 200.

It is important to provide normally the power from the first circuit board 202 to the first inductive coil 610, and thus the lidar sensor rotates only the second circuit board 206 without rotating the first circuit board 202. Since the first circuit board 202 does not rotate, the power may be smoothly supplied from the first circuit board 202 to the first inductive coil 610, without the breakdown.

Of course, the power supplying method may be variously modified as long as the rotation of the lidar module 200 is assured without using the cable. It will be immediately obvious to those skilled in the art that this modification and variation belong to the scope of the disclosure.

The second circuit board 206 is for example a PCB, may rectify the power generated by the power generation unit 204 and apply the rectified power to the lidar module 200.

If electromagnetic wave is induced by the inductive coil, the lidar module 200 may use an RF signal in accordance with the electromagnetic induction for communication with an external device.

The second circuit board 206 may deliver lidar information outputted from the lidar module 200 to the first circuit board 202 through wireless communication, e.g. optical communication.

Particularly, an optical transmission unit 300 may be set to a lower surface of the second circuit board 206 and an optical reception unit 302 may be established to an upper surface of the first circuit board 202. In this case, the optical transmission unit 300 may output light corresponding to the lidar information, and the optical reception unit 302 may detect the lidar information through analysis of the received light and provide the detected lidar information to the first circuit board 202. The first circuit board 202 may transmit the lidar information to the computing device. That is, the lidar information outputted from the lidar module 200 may be provided to the computing device by using the optical transmission unit 300 set to the lower surface of the second circuit board 206 and the optical reception unit 302 established to the upper surface of the first circuit board 202.

In one embodiment, the optical transmission unit 300 and the optical reception unit 302 may be disposed inside the inductive coils 610 and 612 as shown in FIG. 3 and FIG. 6.

On the other hand, location of the optical transmission unit 300 changes continuously because the second circuit board 206 rotates. Accordingly, it is effective that a plurality of optical reception units, e.g. optical reception units 302a, 302b, 302c and 302d disposed at an interval of e.g. 90° not one optical reception unit 302 may be formed on the first circuit board 202 as shown in FIG. 4, considering the rotation of the second circuit board 206. However, the optical communication may be normally performed though one optical reception unit 302 set on the first circuit board 202, because the light becomes spread.

In above description, the lidar information is delivered through the optical communication. However, the communication for delivering of the lidar information is not limited as optical communication as long as it is wireless communication.

The motor 208 may be mounted to a lower surface of the first circuit board 202, and its axis or a shaft connected to the axis may be combined with the lower surface of the second circuit board 206. As a result, the second circuit board 206 rotates when the axis of the motor 208 rotates, thereby rotating the lidar module 200. For example, the motor 208 may be a BLDC (Brushless DC Electric Motor) motor.

The window 210 may block visible light with protecting the lidar module 200, thereby reducing optical noise.

The upper cover 212 and the lower cover 214 may cover the lidar module 200, the circuit boards 202 and 206, the power generation unit 204 and the motor 208 to protect them. The first circuit board 202 may be disposed on the lower cover 214 as shown in FIG. 1 because the lidar module 200 should output a laser outside. Here, the motor 208 may be inserted in the lower cover 214.

Hereinafter, inner structure of the power generation unit 204 will be described in detail with reference to FIG. 6.

In FIG. 6, the first inductive coil 610 may be disposed between a first cylinder 600 and a second cylinder 602, and the second inductive coil 612 may be disposed between a third cylinder 604 and a fourth cylinder 606. Here, the third cylinder 604 and the fourth cylinder 606 locate inside the second cylinder 602.

The cylinders 600, 602, 604 and 606 may have a cylindrical shape, and the inductive coils 610 and 612 may be circularly disposed along an outer circumference surface of the cylinders 600, 602, 604 and 606.

In one embodiment, the first inductive coil 610 may be electrically connected to the first circuit board 202, and the second inductive coil 612 may be electrically connected to the second circuit board 206.

The axis of the motor 208 or the shaft may be connected to the lower surface of the second circuit board 206 inside the fourth cylinder 606, and so the second circuit board 206 and the lidar module 200 disposed on the second circuit board 206 can rotate when the axis of the motor 208 rotates.

The first inductive coil 610 does not rotate though the axis of the motor 208 rotates because the first cylinder 600, the second cylinder 602 and the first inductive coil 610 are not connected to the second circuit board 206. Whereas, the second inductive coil 612 may rotate in response to the rotation of the axis of the motor 208 because the third cylinder 604, the fourth cylinder 606 and the second inductive coil 612 are connected to the second circuit board 206.

In one embodiment, an air gap exists between the second cylinder 602 and the third cylinder 604, and thus friction does not occur between the inductive coils 610 and 612.

On the other hand, amount of the power induced by the inductive coils 610 and 612 may be adjusted depending on turns ratio of the inductive coils 610 and 612.

In one embodiment, the optical transmission unit 300 and the optical reception unit 302 for optical communication may be disposed inside the fourth cylinder 606.

In another embodiment, reflective material may be coated on an inner surface of the fourth cylinder 606. As a result, the light outputted from the optical transmission unit 300 is better delivered to the optical reception unit 302, and so more effective optical communication may be achieved.

In still another embodiment, a shield may be formed inside the fourth cylinder 606 in the event that the lidar information is delivered to the first circuit board 202 through an RF communication not the optical communication.

Briefly, the lidar sensor of the present embodiment may rotate the lidar module 200 formed on the second circuit board 206 by rotating the second circuit board 206.

Since the rotation of the lidar module 200 is assured, power supplying to the lidar module 200 may be performed by using the inductive coils 610 and 612 without using the cable. Accordingly, the power may be smoothly supplied to the lidar module 200 with preventing breakdown of the lidar module 200, though the lidar module 200 rotates.

Additionally, the lidar information may be delivered through the optical communication without using the cable considering the rotation of the lidar module 200, when the lidar information (inside information) obtained by the lidar module 200 is transmitted to external computing device. Specially, the optical transmission unit 300 and the optical reception unit 302 for optical communication may be disposed inside the inductive coils 610 and 612, considering utilization of space.

The first circuit board 202 may include a terminal to which the first inductive coil 610 is connected, a terminal connected to the battery of the vehicle, etc., a controller for controlling the power supplying to the first inductive coil 610, a terminal connected to a cable used for transmitting the lidar information to the computing device and a communication unit for the optical communication, which is not mentioned above.

The second circuit board 206 may include a terminal to which the second inductive coil 612 is connected, a rectifier for rectifying the power generated by the second inductive coil 612, a terminal for the power supplying to the lidar module 200 and a communication unit for the optical communication.

Components in the embodiments described above can be easily understood from the perspective of processes. That is, each component can also be understood as an individual process. Likewise, processes in the embodiments described above can be easily understood from the perspective of components.

Also, the technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present disclosure or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the disclosure, and vice versa.

The embodiments of the disclosure described above are disclosed only for illustrative purposes. A person having ordinary skill in the art would be able to make various modifications, alterations, and additions without departing from the spirit and scope of the disclosure, but it is to be appreciated that such modifications, alterations, and additions are encompassed by the scope of claims set forth below.

The invention claimed is:

1. A lidar sensor comprising:
a second board;
a lidar module disposed on one surface of the second board and configured to scan a specific range; and
a power generation unit configured to generate a power, wherein the power generated by the power generation unit is supplied to the lidar module through the second board without using a cable, and the lidar module does not rotate itself but rotates in response to rotation of the second board.

2. The lidar sensor of claim 1, further comprising:
a first board; and
a motor formed on a lower surface of the first board,
wherein the power generation unit generates the power by using inductive coils while it is disposed between the first board and the second board, an axis of the motor or a shaft connected to the axis is connected to the second board, and the second board and the lidar module disposed on the second board rotate in response to rotation of the axis.

3. The lidar sensor of claim 2, wherein a first inductive coil is electrically connected to the first board and a second inductive coil is electrically connected to the second board,
and wherein the second inductive coil rotates but the first inductive coil does not rotate when the second board rotates, and the power is generated through the second inductive coil according as a power supplied to the first inductive coil through the first board is changed.

4. The lidar sensor of claim 3, wherein the first inductive coil is disposed between a first cylinder and a second cylinder, and the second inductive coil is disposed between a third cylinder and a fourth cylinder,
and wherein an air gap exists between the second cylinder and the third cylinder facing to the second cylinder.

5. The lidar sensor of claim 2, wherein an optical transmission unit is formed on a lower surface of the second board and an optical reception unit is formed on an upper surface of the first board,
and wherein the optical transmission unit and the optical reception unit is disposed inside the power generation unit, lidar information outputted from the lidar module is transmitted to the optical transmission unit through the second board, the optical transmission unit output a light corresponding to the transmitted lidar information, the optical reception unit detects the lidar information by analyzing the outputted light and delivers the detected lidar information to the first board, and the first board transmits the delivered lidar information to a computing device located outside the lidar sensor.

6. The lidar sensor of claim 5, wherein reflective material is coated on an inner surface of the power generation unit, and plural optical reception units are disposed on the first board.

7. The lidar sensor of claim 2, wherein the lidar sensor further includes a window for covering surroundings of the lidar module, the first board and the second board, and an upper cover and a lower cover for covering an upper surface and a lower surface of the lidar module, the first board and the second board,
and wherein the window reduces optical noise by blocking a visible light, the first board locates on an upper surface of the lower cover, and the motor locates inside the lower cover.

8. The lidar sensor of claim 1, wherein the lidar module is removable from the second board, and the lidar module scans only a specific range while it is separated from the second board.

9. The lidar sensor of claim 1, wherein at least one light emitting unit and a light reception unit are included in the lidar module,
and wherein the lidar module rotates in response to rotation of the second board, scans a specific area with higher resolution than the other area in view of horizontal resolution by adjusting an operation frequency of the light emitting unit, or scans a certain area with higher resolution than the other area in view of vertical resolution by controlling differently an operation frequency of a part of light emitting units for outputting a light in different direction.

10. A lidar sensor comprising:
a first board;
a second board;
a lidar module disposed on one surface of the second board and configured to scan a specific range;
a transmission unit disposed on other surface of the second board; and
a reception unit disposed on the first board,
wherein the lidar module does not rotate itself but rotates in response to rotation of the second board, lidar information outputted from the lidar module is transmitted from the transmission unit to the reception unit through wireless communication, and the reception unit provides the transmitted lidar information to an external computing device.

11. The lidar sensor of claim 10, wherein the transmission unit is an optical transmission unit and the reception unit is an optical reception unit,
and wherein the lidar information outputted from the lidar module is transmitted to the optical transmission unit through the second board, the light transmission unit delivers the lidar information to the optical reception unit by using optical communication without using a cable, and the optical reception unit provides the lidar information to the computing device via the first board.

12. The lidar sensor of claim 10, further comprising:
a power generation unit disposed between the first board and the second board and configured to generate a power,
wherein the power generated by the power generation unit is supplied to the lidar module through the second board without using a cable, a first inductive coil of the power generation unit is electrically connected to the first board, a second inductive coil of the power generation unit is electrically connected to the second board, and electromotive force is generated through the second inductive coil when a power supplied to the first inductive coil via the first board is changed.

13. A lidar sensor comprising:
a first board;
a second board;
a lidar module disposed on one surface of the second board and configured to scan a certain range; and
a motor,
wherein an axis of the motor or a shaft connected to the axis is connected to the second board, information outputted from the lidar module is transmitted to the first board through the second board, the second board and the lidar module rotate in response to rotation of the axis of the motor, and the lidar module does not rotate itself.

14. The lidar sensor of claim 13, wherein the lidar module is removable from the second board, and the lidar module scans only a specific range while it is separated from the second board.

15. The lidar sensor of claim 13, further comprising:
a power generation unit configured to generate a power by using a first inductive coil and a second inductive coil and disposed between the first board and the second board,
wherein the first inductive coil is electrically connected to the first board, the second inductive coil is electrically connected to the second board, and the second inductive coil rotates but the first inductive coil does not rotate when an axis of the motor rotates.

* * * * *